Patented May 1, 1923.

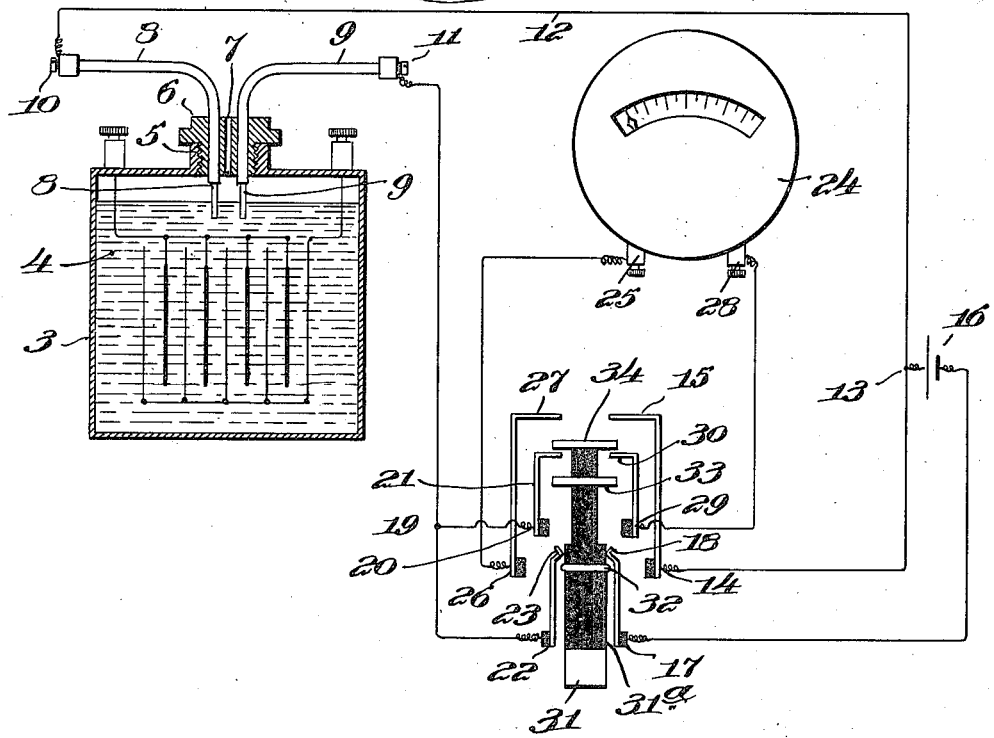
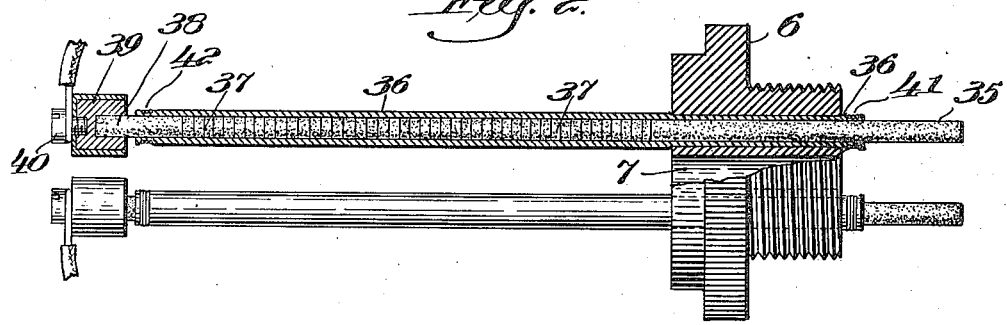

1,453,602

UNITED STATES PATENT OFFICE.

DAVID R. PRICE, OF NEWTONVILLE, MASSACHUSETTS, ASSIGNOR OF ONE-HALF TO LELAND POWERS, OF NEWTONVILLE, MASSACHUSETTS.

LIQUID-LEVEL INDICATOR.

Application filed February 13, 1920. Serial No. 358,495.

*To all whom it may concern:*

Be it known that I, DAVID R. PRICE, citizen of the United States of America, and resident of Newtonville, in the county of Middlesex and State of Massachusetts, have invented new and useful Improvements in Liquid-Level Indicators, of which the following is a specification.

The present invention relates to an apparatus for indicating liquid levels and comprises means for electrically indicating such levels at points remote from the liquid.

While my invention is of broad application, I have shown and described herein for the purpose of illustration a specific embodiment thereof adapted to indicate the level of the liquid in a storage battery of the usual type having a liquid electrolyte.

Batteries of this type are in general use on motor cars for starting and lighting purposes and the drivers of such cars are prone to neglect the battery, which results in deterioration thereof with consequent failure to deliver sufficient current for the purposes desired. It is essential that the liquid electrolyte in such batteries be kept at the proper level and it is therefore highly desirable to permit the driver to readily and easily determine whether or not the liquid level is such as to demand the addition of more liquid. If means are provided whereby this level may be indicated to the driver without leaving his seat, neglect of the battery will be largely obviated.

It is an object of my invention to provide convenient, reliable and efficient means for indicating the liquid level in a storage battery or the like and to provide means for causing said indication to appear at a point remote from the battery.

More specifically as shown in the present embodiment, it is an object to provide an electrically operated level indicating system whereof the indicator proper is suitable for mounting on the instrument board of a motor vehicle where it will at all times be visible to the driver. It is also an object to provide a device which will indicate independently of electrical leakage and of the deteriorating corrosive action upon the indicating electrode of the sulphuric acid or other electrolyte on the battery.

Other and further objects will appear as the description proceeds.

The construction of an efficient and reliable level indicator for sulphuric acid or other similar highly corrosive electrolytes involve the meeting of a mumber of special requirements. The simple expedient of extending two conductors below the normal surface of the solution to the point below which attention is necessary, causing a current to pass between the electrodes through the electrolyte and indicating its passage upon a meter included in the circuit will not accomplish the desired result. I have found that in such an arrangement, after exposure to the electrolyte in the battery, the electrodes and the insulation support which bridges the electrodes will become saturated with the electrolyte and will continue to indicate after the liquid has receded below the electrodes.

On the other hand if the two electrodes are immersed in the liquid and a current is passed through the circuit, the electrodes will become polarized in a small fraction of a second. This latter trouble is especially marked if a large quantity of electricity is passed through the circuit. If a very low electromotive force is used to supply the circuit, with a correspondingly low total resistance so that just a sufficient amount of current is passed to actuate the meter, the polarization takes place almost instantly and what small indication is obtained is due to leakage between electrodes. If a relatively high electromotive force is used in the circuit and a correspondingly high resistance is introduced so that just enough current is obtained to actuate the meter, then, even if the electrodes are not touching the liquid a relatively large current will flow since the leakage resistance due to the film of acid on the insulating material between the electrodes is small compared to the total resistance in the circuit. An indication other than correct will therefore almost always be obtained in any case, irrespective of how the various electrical quantities in the circuit are proportioned. Moreover, if a high electromotive force and a relatively high current is used, a large quantity of heat is developed which is destructive to the insulation of the element and detrimental to the storage battery.

All of the above described difficulties are avoided in my improved indicator since I utilize the electrolyte not as a mere link in the indicating current but as the source of that current. That is, I utilize the liquid as the electrolyte of a secondary battery by providing means to cause the indicating electrodes to act, temporarily at least, as the electrodes of such a battery. This involves passing an amount of electricity into the electrodes sufficient to cause at least partial polarization.

I have illustrated a preferred embodiment of my invention in the accompanying drawings, in which—

Fig. 1 is a diagrammatic illustration of the principle of my invention; and

Fig. 2 is a detailed showing of a preferred form of electrode used in my apparatus.

As shown in Figure 1, the storage battery 3, contains the liquid electrolyte 4, and has the usual filling opening 5 in its top. This opening is closed by the plug 6 formed of vulcanite or similar material. The plug has a central relief vent 7 and has the electrodes 8 and 9 fitting into other spaced openings. The electrodes 8 and 9 are fitted with the binding posts 10 and 11 respectively. Connected to the terminal 10 is a conductor 12 which branches at 13, one branch connecting to the terminal 14 of the switch contact 15. The other branch from 13 is connected to a small primary battery 16, the opposite electrode of which is connected to the terminal 17 of the switch contact 18. The terminal 11 of the electrode 9 branches at 19, one branch being connected to the terminal 20 of its switch contact 21 and the other being connected to the terminal 22 of the switch contact 23.

The meter 24 is a direct current voltmeter of low operating current and voltage, preferably of the ordinary small d'Arsonval type. The binding post 25 is connected to the terminal 26 of the switch contact 27 and the other binding post 28 is connected to the terminal 29 of the switch contact 30. The switch plunger 31 has a body 31ª of non-conducting material and carries the contact ring 32 adapted to close the circuit between switch contacts 18 and 23, the contact plate 33 adapted to close the circuit between switch contacts 21 and 30 and the contact plate 34, adapted to close the circuit between the switch contacts 15 and 27. It should be noted that the ring 32 and plates 33 and 34 are so located on the plunger that when the ring 32 is in contact with switch contacts 18 and 23, the plates 33 and 34 are out of contact with their respective switch contacts and vice versa.

The electrode shown in detail in Fig. 2 comprises a carbon contact member 35, the upper end of which extends into the insulating tube 36, the plurality of carbon discs 37, and the connecting carbon rod 38, which latter has the terminal 39 cast upon its outer end. This terminal carries the contact screw 40. The ends of the rubber tube 37 are held fixed to the carbon rods 35 and 38 by means of the ties 41 and 42 respectively. These ties may be of rubber or of any material inert in the electrolyte. I have more specifically described and claimed this electrode in my copending application Serial No. 358,494, filed on even date herewith.

My indicating apparatus is operated by the movement of the button 31. The button is pushed in from the position in which it is shown in Fig. 1, or the movement would be upward with the device as placed in the drawing. During this movement of the button, the ring 32 momentarily closes the circuit between the contacts 18 and 23 which operates to close the circuit of the small primary battery 16. The circuit passes from one side of the battery through the line 12, binding post 10, electrode 8, electrolyte 4, electrode 9, binding post 11, branch 19 to the terminal 22, switch contact 23, ring 32, switch contact 18, terminal 17 and back to the other side of the battery 16. This circuit may only be closed momentarily, that is, for the small fraction of a second, as the plunger 31 moves into its closed position, but this length of time is sufficient to cause polarization of the electrodes 8 and 9 if they extend below the surface of the electrolyte.

When the plunger passes on, this circuit is broken and at the end of its travel the circuit which includes the voltmeter is closed. This circuit extends from the voltmeter 24, through the binding post 25, terminal 26, switch contact 27, plate 34, switch contact 15, terminal 14, line 12 past the branch 13, binding post 10, electrode 8, electrolyte 4, electrode 9, binding post 11, branch 19 to terminal 20, switch contact 21, plate 33, switch contact 30, terminal 29 and back to the meter 24 through binding post 28.

With this combination of circuits the reading given by the voltmeter will be a positive indication as to whether the electrolyte is above or below the ends of the electrodes. If the electrolyte is above the ends of the electrodes, the momentary closing of the circuit of the said primary battery 16 will sufficiently polarize the electrodes 8 and 9 so that when the plunger 31 is in its fully pushed position and closes the voltmeter circuit, the electrodes will deliver current giving a positive indication on the meter. The amount of the indication, within certain limits, will depend upon the depth of immersion of the electrodes.

On the other hand if the electrodes are out of contact with the electrolyte, no polarization takes place when the battery 16 is temporarily cut in and there is therefore no output of current when the circuit is closed and hence there is no indication on the voltmeter. This would be true even if the electrodes were connected by a metallic conductor. Only an infinitesimal amount of heat is generated by the momentary closing of the battery circuit, as the battery is quite small, an ordinary dry cell of the type used in flash lights being suitable.

The indication given by the apparatus is independent of leakage between the electrodes when the electrolyte is below the electrodes, and is independent of any except very abnormally large leakage between the electrodes when the electrolyte is above their ends. In fact in the last case, the indication is reliable even when the insulation is reduced to substantially a short circuit between the electrodes, a condition which is not even approximated in practice.

As the input of electricity to the electrodes from the primary battery 16 is only momentary and of relatively low power, the voltmeter, as has been stated, should be of a type to register small differences in potential. As the plunger is closed, the needle of the meter will jump across the dial, provided the electrodes have extended into the electrolyte, and the needle will gradually return to normal as the output from the electrodes depolarizes them.

I claim:

1. The method of determining the level of the electrolyte in a storage battery or the like which consists in placing test electrodes therein in such manner that when the electrolyte is at its normal level it will form a secondary battery in connection with said test electrodes, and when the electrolyte is below its normal level it will be out of contact with said electrodes, including the electrodes in a power circuit whereby if they form part of a secondary battery they will receive electromotive input, breaking said circuit and thereafter placing a meter across the electrodes whereby the presence or absence of said input is indicated.

2. The method of determining the level of the electrolyte in a storage battery or the like which consists in introducing into the battery electrodes adapted to extend into the electrolyte when it is at its normal level, and adapted to be out of contact with the electrolyte when it is low enough to demand attention, connecting the electrodes to the opposite poles of a source of electricity whereby a current will pass between the electrodes if they extend below the level of the electrolyte, which current will polarize the electrodes, disconnecting the electrodes from the source of electricity and thereafter connecting a voltmeter across the electrodes whereby if the electrodes are polarized a difference of potential will be registered by said voltmeter.

3. Apparatus for determining the level of an electrolyte, said apparatus comprising a pair of electrodes inserted into the electrolyte at approximately the normal level thereof, a battery in circuit across the two electrodes, a voltmeter also in circuit across the electrodes, and means for closing the battery and voltmeter circuits separately whereby the polarization produced upon the electrodes by the closing of the battery circuit may be indicated upon the closing of the volt-meter circuit immediately thereafter.

4. Apparatus for determining the level of an electrolyte, said apparatus comprising a pair of electrodes inserted into the electrolyte at approximately the normal level thereof, a battery in circuit across the two electrodes, a voltmeter also in circuit across the electrodes, and means for closing the battery and voltmeter circuit separately, said means preventing simultaneous closure of the two circuits.

5. Apparatus for determining the level of an electrolyte, said apparatus comprising a pair of electrodes inserted into the electrolyte at approximately the normal level thereof, a battery in circuit across the two electrodes, a voltmeter also in circuit across the electrodes, and switch means to momentarily close the battery circuit, then to open said circuit and close the voltmeter circuit.

6. Apparatus for determining the level of an electrolyte, said apparatus comprising a pair of electrodes inserted into the electrolyte at approximately the normal level thereof, a battery in circuit across the two electrodes, a voltmeter also in circuit across the electrodes, and a switch having a contact to momentarily close the battery circuit as the switch member is moved, and having contacts to close the voltmeter circuit when the switch is at one limit of its movement.

7. The method of determining the level of an electrolyte in a storage battery or the like comprising momentarily applying a potential across a pair of electrodes which project somewhat below the normal level of the electrolyte and subsequently testing the terminals for polarization current.

8. The method of determining the level of an electrolyte in a storage battery or the like comprising spacing a pair of electrodes slightly beneath the normal level of the electrolyte, momentarily applying across said electrodes a potential sufficient to produce a state of polarization between the electrodes if the electrodes are in contact with the electrolyte, and then quickly testing the terminals for current resulting from the polarization if any.

Signed by me at Boston, Massachusetts, this 6th day of February, 1920.

DAVID R. PRICE.